United States Patent [19]

Kistner

[11] 3,805,531

[45] Apr. 23, 1974

[54] CONSOLIDATION OF MINERAL AGGREGATE

[75] Inventor: John F. Kistner, Stillwater, Minn.

[73] Assignee: Minnesota Mining and Manufacturing Company, St Paul, Minn.

[22] Filed: Dec. 21, 1970

[21] Appl. No.: 100,378

[52] U.S. Cl. .......... 61/36 R, 260/29.2 TN, 166/295
[51] Int. Cl. ..................... E02d 3/14, E21b 33/138
[58] Field of Search ................... 61/36 R; 166/295; 260/29.2 TN, 2.5 AT; 264/36

[56] References Cited
UNITED STATES PATENTS

| | | | |
|---|---|---|---|
| 3,719,050 | 3/1973 | Asao et al. | 61/36 R |
| 2,929,800 | 3/1960 | Hill, Jr. | 260/77.5 |
| 3,367,892 | 2/1968 | Jorczak et al. | 166/295 X |
| 2,867,278 | 1/1959 | Mallory et al. | 166/295 |
| 3,181,611 | 5/1965 | Dollarhide | 166/295 |
| 2,889,883 | 6/1959 | Santora | 166/295 |
| 3,379,253 | 4/1968 | Chism | 166/295 |
| 3,443,637 | 4/1969 | Sparlin et al. | 166/295 |
| 3,181,612 | 5/1965 | West et al. | 166/295 X |

*Primary Examiner*—Stephen J. Novosad
*Attorney, Agent, or Firm*—Alexander, Sell, Steldt & Delahunt

[57] ABSTRACT

A permeable mass of moisture-containing mineral aggregate, such as superficial soil or sand, is contacted with a fluid agent comprising hydrophilic urethane prepolymer to form in situ an insoluble, hydrophilic polyurethane-polyurea polymeric matrix which adhesively bonds the aggregate together as a consolidated unitary mass useful, for example, as a load-bearing structure or as a relatively water-impermeable barrier.

11 Claims, No Drawings

CONSOLIDATION OF MINERAL AGGREGATE

This invention relates to consolidation of mineral aggregate. In another aspect, it relates to a method for consolidating or stabilizing superficial mineral aggregate, such as soil or sand, to form a consolidated structure, and to the structure so formed. In another aspect, it relates to hydrophilic urethane prepolymer useful as a treating agent in the consolidation of superficial mineral aggregate. In a still further aspect, it relates to a hydrophilic polyurethane-polyurea polymer.

The prior art discloses the use of a host of materials and techniques for the treatment of mineral aggregate, such as soil or sand, to overcome problems arising from the inherent unconsolidated or poorly consolidated nature of the aggregate and form consolidated structures which are load-bearing or water-impermeable, this art usually being referred to as soil stabilization. The type of material generally extolled in the art for consolidating particulate matter such as soil and sand is acrylamide polymer. Though polyurethane polymers are also known for sealing subterranean formations penetrated by wellbores (e.g., see U.S. Pat. Nos. 2,867,278 issued Jan. 6, 1959 to Mallory et al., U.S. Pat. No. 3,181,611 issued May 4, 1965 to Dollarhide, and U.S. Pat. No. 3,181,612 issued May 4, 1966 to West et al.), such polymers and their manner of use have limitations or deficiencies and as far as is known have not enjoyed any practical use in the consolidation of superficial mineral aggregate.

Briefly, one aspect of this invention comprises contacting a permeable mass of moisture-containing mineral aggregate, such as superficial soil, sand, or the like, with hydrophilic urethane prepolymer, such as polyoxyethylene polyol urethane prepolymer, having at least two free isocyanate moieties, which, in the presence of the moisture contained in the aggregate, cures, polymerizes or crosslinks to form a solid, water-insoluble hydrophilic polyurethane-polyurea matrix which adhesively bonds the treated aggregate together as a consolidated unitary mass having enhanced physical properties such as increased strength and resistance to mechanical or natural forces.

Said agent has the advantage of being a one-part system, requiring no elaborate equipment for preparation of the agent or its application to the aggregate, and does not require the use of a catalyst or any co-reactant material other than water. Consolidation can be carried out in cold or hot weather and is applicable to a wide variety of aggregate. Unlike soil stabilizers such as asphalt, the agent of this invention preserves the natural appearance of the aggregate.

Isocyanate-terminated prepolymers, sometimes referred to as urethane prepolymers, are broadly known in the art. Some of the prepolymers used in this invention are known and others are believed novel. Generally they can be prepared by reacting a material having a plurality of active hydrogen atoms, such as polyols, with an amount of an organic polyisocyanate (or polyisothiocyanate) in excess of stoichiometry. The equivalent ratio of isocyanate moiety, —NCO, to active hydrogen will be at least 2/1, and preferably at least 2.1/1 to 2.5/1, and can be as high as 4/1 or higher.

One useful class of prepolymers which can be used in this invention are those which are water miscible and can be expressed in terms of the formula

$$Y_1[(RO)_o—Y_2(—NCO)_p]_z \qquad \text{I}$$

where $Y_1$ is an active hydrogen-free residue of a compound having a plurality of active hydrogen atoms, e.g., polyhydroxy alkane or polyamino alkane such as ethylene glycol or ethylene diamine; $(RO)_o$ is a hydrophilic polyoxyalkylene chain having a plurality of oxyethylene units, such as (1) a polyoxyethylene chain (the preferred type of chain), (2) a chain having alternating blocks or backbone segments of oxyethylene units and blocks or backbone segments of oxypropylene units, or (3) a chain of randomly distributed (i.e., a heteric mixture) of oxyethylene and oxypropylene units; "$o$" is the number of oxyalkylene units in said polyoxyalkylene chain; $Y_2$ is a linkage or bridge the function of which is to bond said polyoxyalkylene chain to the isocyanate moieties shown in the formula; "$p$" is the number of said isocyanate moieties and generally will be 1 to 5, preferably 1 to 3; and "$z$" is a number equal to the functionality, or number of said plurality of active-hydrogen atoms, in said compound (e.g., said polyhydroxyalkane or polyaminoalkane) which provides said residue $Y_1$ and generally "$z$" will be 2 to 6. Where said prepolymer is prepared by reacting a polyol and a polyisocyanate, the polyoxyalkylene chain will be terminated with —OC(O)NH—R'(—NCO)$_p$, where —OC(O)NH— is a carbamate (or urethane) group resulting from the reaction of a hydroxyl group from said polyol precursor with an isocyanate moiety from said polyisocyanate precursor, R' is the residue or nucleus of said polyisocyanate precursor (which will be tolylene where said polyisocyanate precursor is tolylene diisocyanate), and "$p$" is an integer equal to $q-1$, where "$q$" is the number of isocyanate moieties of said polyisocyanate precursor.

(The term "active hydrogen atom" as used herein refers to a hydrogen atom which reacts with the isocyanate moiety under urethane or urea bond forming conditions. The term "water-miscible" in this context means the prepolymer is dispersible (or soluble) in water.)

A useful subclass of water-miscible prepolymers within the scope of formula I are those of the formula

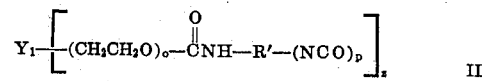

where $Y_1$, R', "$o$," and "$z$" are as defined above, R' is tolylene, "$o$" is the number of oxyethylene units shown, "$p$" is 1 to 3, and "$z$" is equal to the functionality, e.g., 2 or 3, of said compound from which $Y_1$ is derived.

Another subclass of water-miscible prepolymers useful in the consolidation of aggregate according to this invention can be expressed by the formula

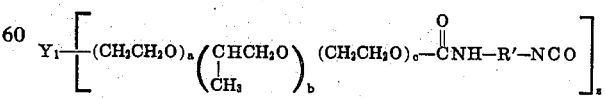

where $Y_1$, R', and z are as defined above in formula II, and a, b, and c are integers such that the ratio of $(a+c)/b$ is greater than 1 (and thus the prepolymers are water-miscible).

Commercially available polyol precursors useful in making the above-described water-miscible isocyanate-terminated prepolymers used in this invention are the hydrophilic poly(oxyethylene-oxypropylene) polyols sold under the trademark "Pluronic," such as Pluronic L35, F38, and P46, and hydrophilic polyols with heteric oxyethylene-oxypropylene chains sold as "Polyol Functional Fluids," such as WL–580, WL–600, and WL–1400. Generally, the hydrophilic or water-soluble oxyethylene-containing polyols to be used will have molecular weights of at least 200 and as high as 8,000; preferably they will have molecular weights of 400 to 2,000. A preferred polyol (particularly when reacted with tolylene diisocyanate to form the prepolymer) is "Carbowax" 1,000, which is a polyethylene glycol having a molecular weight of about 1,000.

Though the prepolymers of formulas I, II and III will be useful in many applications of this invention, the resulting cured polyurethane-polyurea polymers resulting from in situ polymerization thereof in some cases will be relatively highly water-swellable when in contact with water due to their high degree of hydrophilicity (e.g., where the polyoxyalkylene backbone consists of oxyethylene units only). As a consequence, the dimensional stability of the consolidated mass of mineral aggregate will be less than that desirable for some applications, for example where a relatively flat, planar or smooth exposed top surface for the consolidated mass is desired. Thus, where dimensional stability is desired, a prepolymer can be used which contains both hydrophobic oxyalkylene (e.g., oxypropylene or higher oxyalkylene) backbone segments or units and hydrophilic oxyethylene backbone segments or units, the relative number of the two types of units in the prepolymer being such that the prepolymer is water-miscible (e.g., the overall carbon-to-oxygen atom ratio in the polyoxyalkylene portion of the prepolymer being greater than 2/1 but preferably less than 2.5/1). Alternatively, instead of using a prepolymer having both hydrophilic and hydrophobic portions, a mixture of prepolymers can be used comprising the water-miscible prepolymers of said formulas I, II, or III with hydrophobic, water-insoluble prepolymers, such as polyoxypropylene-based prepolymers having a structural formula like formula I except that $(RO)_o$ is a chain for oxypropylene units, or like formula II except $—CH(CH_3)CH_2O—$ replaces $—CH_2CH_2O—$, or like formula III except $(a + c)/b$ is less than 1 (the latter being derived, for example, from Pluronic L81, L61, L92 and L101). The relative amounts of the water-miscible prepolymer and water-insoluble prepolymer in such mixtures are such that the mixtures are water-miscible. These various prepolymers or prepolymer mixtures, used to obtain better dimensional stability, upon curing in contact with water in the aggregate, yield water-insoluble polyurethane-polyurea polymers having reduced hydrophilicity as compared to those resulting from the curing of the water-miscible prepolymers such as those of said formulas I and II, and thus are relatively less water-swellable.

Polyisocyanates which can be used to prepare the isocyanate-terminated prepolymers used in this invention and described above include conventional aliphatic and aromatic polyisocyanates. The preferred polyisocyanates to be used will be aromatic polyisocyanates because the prepolymers made therefrom will generally react faster with water. One of the most useful polyisocyanate compounds which can be used for this purpose is tolylene diisocyanate, particularly as a blend of 80 weight percent of toluene-2,4-diisocyanate, and 20 weight percent of toluene-2,6-diisocyanate. A 65:35 blend of the 2,4- and 2,6-isomers is also useful. These polyisocyanates are commercially available under the trademark Hylene TM, Nacconate 80, and Mondur TD–80. Other useful polyisocyanate compounds which can be used are other isomers of tolylene diisocyanate, hexamethylene-1,6-dissocyanate, diphenylmethane-4,4'-diisocyanate, m- or p-phenylene diisocyanate, and 1,5-naphthalene diisocyanate. Polymeric polyisocyanates can also be used, such as polymethylene polyphenyl polyisocyanates, such as those sold under the trademarks Mondur MRS and PAPI. A list of useful commercially available polyisocyanates is found in "Encyclopedia of Chemical Technology," by Kirk and Othmer, 2nd Ed., Vol. 12, pp. 46–47, Interscience Pub., (1967).

The prepolymers per se used in this invention are generally very viscous liquids and though they can be used by themselves as treating agents, it is preferred to employ the same in the form of a solution in a suitable solvent which is non-reactive with the isocyanate moiety. Thus, organic solvents, or any other organic compounds, which contain active hydrogen atoms are to be avoided in making up and using the prepolymer agents of this invention. Generally these solvents can be water-miscible polar organic solvents, preferably volatile at ambient conditions. Alternatively, the solvent can be a water-immiscible organic solvent which volatilizes under ambient conditions and escapes to the atmosphere from the treated mass of aggregate. Representative solvents which can be used include acetone, tetrahydrofuran, methyl ethyl ketone, methylene chloride, toluene, and methoxyethylacetate. Water itself can be used as a solvent though the resulting solution will have to be applied to the mineral aggregate before the curing of the prepolymer takes place. By controlling the temperature of the aqueous solution, the hiatus between making up the aqueous solution and its application to the aggregate can be varied; the lower the temperature, the longer the pot-life of the solution. The concentration of the prepolymer in the solvent can vary, depending upon such factors as the viscosity desired, the technique of treating the mineral aggregate, and the extent of treatment. Generally, concentrations of 5 to 80 weight percent will be suitable. The lower the concentration, the lower will be the degree of cellular structure in the poly-urethane-polyurea polymer. If desired, the solution can contain other materials, such as pigments to color the treated aggregate, grass seed, fertilizer, herbicides, and mulches.

Upon application of the prepolymer treating agent to the permeable mass of mineral aggregate desired to be consolidated, the prepolymer reacts with the water naturally in or added to the aggregate. The mechanism of this reaction, is well-known; it results in the formation of urea linkages, the water acting as a chain extender, and in the evolution of carbon dioxide which tends to foam the reaction mixture and form a cellular polymer. The degree of foaming depends upon the environmental confines of the mineral aggregate, the amount of solvent in the treating agent, and amount of water in the aggregate. By carrying out the consolidation at ambient pressure, the removal of carbon dioxide is facilitated, thus minimizing the cellular structure of the resulting polyurethane-polyurea polymer. Due to the hydrophilic nature of the prepolymer, the prepolymer wets the aggregate, thereby insuring a high degree of contact with the aggregate and adhesive bonding of the aggregate to form a unitary integral mass. The resulting polymer matrix is water insoluble, tough, strong, and can be flexible or rigid, depending on the molecular weight of the prepolymer. The consolidated structure itself can be rubbery or rigid, depending on the amount and molecular weight of the prepolymer used and the particular aggregate bonded therewith.

Generally, the greater the amount of prepolymer used, the denser the resulting consolidated aggregate mass will be. Amounts of prepolymer in the range of 1 to 40 weight percent, or higher, preferably 3 to 20 weight percent, based on the weight of the aggregate, will usually be sufficient to consolidate the aggregate to the desired degree.

The types of mineral aggregate which can be consolidated in accordance with this invention can vary. Generally the mass will be unconsolidated or poorly consolidated or loose. The aggregates representatively include superficial mineral aggregate such as sand, clay, gravel, other siliceous materials, and other particulate materials, usually classified under the broad category of "soil." Aggregate preocessed by mining, washing, etc., e.g., bentonite and kaolinite, and cinders, can also be consolidated by this invention.

Whatever aggregate is treated in accordance with this invention, the mass of aggregate must be permeable and contain water. The term "permeable" in the context means that the mass of aggregate is pregnable by the treating agent of this invention. Thus, the mass must contain sufficient interstitial space or voids between aggregate particles to allow gravity flow and penetration of said agent. If the interstitial space or voids are substantially filled with non-displaceable water or other liquid, the agent will not be able to penetrate and consolidate the mass. The total volume of the space or voids can vary, e.g., from 5 to 25 vol. percent, based on the volume of the mass. However, there must be some water present in the aggregate to function as a chain extender for the curing of the prepolymer; this water can be adventitious moisture absorbed on the aggregate. Usually, the amount of moisture necessary for this purpose will be inherent or naturally present in the aggregate, though if necessary the aggregate can be wetted before or after application of the prepolymer.

The mass of aggregate can be treated as found in its natural state or after it has been relocated, reshaped, or refined. In fact, a consolidated mass can be relocated after it is formed.

The manner of treating or contacting the mass of aggregate with the prepolymer agent can vary. One convenient mode of applying the agent, useful for most purposes, will be superfusion, i.e., merely pouring or sprinkling the agent over the surface of the mass and allowing it to permeate the mass by gravity flow in a manner such that the air present in the interstitial voids between aggregate particles is displaced. Spraying is another mode which can be used, particularly where it is desired to consolidate a very thin layer of the mass of aggregate for soil erosion prevention; this mode of application results in a thin layer of the polyurethane-polyurea polymer being formed on top of the mass, and this layer can contain grass seed, mulch, or the like to enhance erosion control.

The consolidated mass of aggregate formed by this invention will have improved load-bearing capacity and will be relatively water-impermeable, the magnitude of these properties varying with the amount and nature of prepolymer used and the nature of the mass of aggregate. The depth of penetration of the prepolymer into the mass can be varied to achieve various levels of load-bearing. The penetration can vary from less than an inch to as much as 6 inches or more, depending on the permeability of the mass, viscosity, and amount of prepolymer applied and rate of curing of the prepolymer.

The invention will find application in connection with agronomic practices, e.g., erosion prevention of top-soil due to rain or wind, or in connection with landscaping or construction of roadways, airfields, footpaths, embankments, graded construction sites, water courses, such as irrigation ditches, water reservoirs, earth-filled dams, and athletic playing surfaces, such as tennis courts and running tracks. Consolidated topsoil or sand can be overlayed with other construction material. For example, a layer of sand can be consolidated in accordance with this invention to form a substrate and a layer of vulcanized rubber particles bonded to form a composite can be adhesively bonded to the top of the consolidated mass, as described in copending application Ser. No. 87,682 filed by Allen et al., on Nov. 9, 1970. Where structures are to be surrounded or embedded in aggregate, e.g., fence posts, telephone poles, basements of buildings, etc., the aggregate can be consolidated by the practice of this invention to serve as a water barrier and help anchor or stabilize the structure.

Objects and advantages of this invention are illustrated in the following examples, but the various materials and amounts thereof described in these examples, and the various other conditions and details recited therein, should not be construed to unduly limit this invention.

EXAMPLE 1

One-thousand parts by weight of polyoxyethylene diol (Carbowax 1000, having a molecular weight of about 1,000) was stirred and reacted with 351 parts of tolylene diisocyanate (80/20 mixture of the 2,4- and 2,6-isomers) under substantially anhydrous conditions for about 2 hrs., and the reaction mixture allowed to stand for several days. The resulting urethane prepolymer was a viscous liquid (at 25°C.) having a structure like said formula II, where $Y_1$ is the residue of ethylene glycol, $R'$ is tolylene, $o$ is about 21, $p$ is 1, and $z$ is 2.

EXAMPLE 2

Aluminum trays, about 4 inches × 5 inches × 1⅝ inches, were each filled with 600 g. of loose greenhouse potting soil (analysis: sand 62 wt. percent, silt 18.2 wt. percent, clay 8.2 wt. percent, organic matter 2.5 wt. percent, water 9.1 wt. percent). Varying quantities of the prepolymer of Example 1 corresponding to 1, 2, 3, 4, 5, 10 and 20 wt. percent by the weight of the soil were weighed and dissolved in 100 ml. of acetone. The solutions were then poured over the soils in the trays, care being taken to insure thorough wetting of all the soil with the solution. After standing overnight, the soils were removed from their trays and examined. Those containing the higher concentrations (5, 10 and 20 wt. percent) of solid polyurethane-polyurea polymer were very firm and solid. All the samples were consolidated in the form of cakes but the treated soils with only 1 and 2 wt. percent polymer could be easily broken apart by hand. At the 3 wt. percent level, good binding of the soil occurred and the consolidated soil could be broken by hand only with difficulty. At 5 wt. percent polymer and higher, the consolidated samples were strong enough to drop on the floor and to slam with a hammer without causing breaking or crumbling.

EXAMPLE 3

A plot of green lawn was stripped of its natural sod cover and a 44" × 52" portion of the exposed soil was sprinkled with one gallon of a solution of 1,200 g. of the prepolymer of Example 1 in three liters of acetone. After about 24 hrs., the treated soil was consolidated such that a kick with the heel of the foot would not leave a heel indentation. Upon prolonged exposure to rain, the consolidated soil became somewhat softer and spongy in nature, with a slight detachment as a layer from the untreated soil below. Also, swelling with water produced a "wrinkled" effect at the surface of the consolidated soil due to the water swelling of polyurethane-polyurea matrix.

EXAMPLE 4

A plot of approximately 36 ft² of a sandy beach of a lake was treated with about 10 gallons of 25 percent wt./vol. acetone solution of the prepolymer of Example 1. Application was made from a sprinkling can and the treatment extended to the water's edge of the lake. Before said application, a metal rod with a diameter of about one-half inch was hammered into the beach to a depth of about 3 inches to 4 inches and then removed to provide holes in the beach; several dozen such "holes" were made before applying the prepolymer solution. After the applied prepolymer cured to a solid polyurethane-polyurea polymer, the consolidated plot had the same appearance as the surrounding untreated sand. A layer of consolidated sand about 2 inches × 3 inches thick was formed by the treatment, and was hard enough to make a heel indentation impossible. In those areas where the holes had been made with the metal rod, cylinders of consolidated sand depending from the consolidated layer help to adhere it to the untreated earth below. Areas that drained well, consolidated the best; areas with low spots where applied prepolymer solution accumulated, formed thick rubbery skins which wrinkled after becoming water-logged.

EXAMPLE 5

A series of 4 aluminum trays, 7½ inches × 11½ inches × 1⅛ inches, were each filled with about 1,900 g. of the greenhouse potting soil described in Example 2. Various prepolymer solutions were sprinkled over the soil samples. One tray (Run 1) was sprinkled with a 40 percent wt./vol. solution made up by dissolving a polyoxypropylene glycol-based urethane prepolymer in 250 ml. acetone. The latter prepolymer was made by reacting a mixture of about 38 parts by weight polyoxypropylene glycol (mol. wt. ca. 2,000) and 53 parts by weight of polyoxypropylene triol (mol. wt. ca. 6,000) with about 9 parts by weight tolylene diisocyanate in the presence of dibutyltindilaurate catalyst, the prepolymer having an isocyanate equivalent weight of 1,800–2,400 and a viscosity of 60–150 stokes at 25°C. A second tray (Run 2) was sprinkled with another polyoxypropylene glycol-base urethane prepolymer solution made up by dissolving 75 g. of the prepolymer in 250 ml. acetone. This latter prepolymer as made by reacting 7 parts by weight of polyoxypropylene glycol (mol. wt. ca. 2,000) with 3 parts by weight of a polymeric polyisocyanate, Mondur MRS, having an isocyanate equivalent weight of 135, an isocyanate functionality of about 2.7, and the formula:

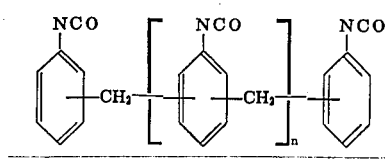

The latter prepolymer has an isocyanate equivalent weight of 734 and the formula

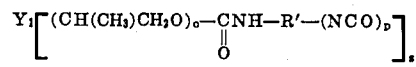

where $Y_1$ is derived from propylene glycol, $R'$ is an aromatic nucleus derived from said polyisocyanate, $o$ is about 33, $p$ is about 2.7 and $z$ is 2. A third tray (Run 3) was sprinkled with a solution made up by dissolving in 250 ml. acetone a mixture of 50 g. of the same polyoxypropylene glycol-based prepolymer used in Run 1 and 50 g. of the prepolymer of Example 1. A fourth tray (Run 4) was sprinkled with a solution made up by dissolving in 250 ml. acetone a mixture of 35 g. of the polyoxypropylene glycol-based prepolymer of Run 2 and 35 g. of the prepolymer of Example 1. Each treated tray of soil was allowed to stand for several days to allow evaporation of solvent and curing of the prepolymer to form a solid polyurethane-polyurea polymer. The resulting consolidated cakes of soil were examined. Results are summarized below:

| Run | Prepolymer used | Nature of Consolidated Soil |
| --- | --- | --- |
| 1 | Polyoxypropylene glycol-based prepolymer made with tolylene diisocyanate | Weak, easily crumbled by hand |
| 2 | Polyoxypropylene glycol-based prepolymer made with Mondur MRS | Weak, easily crumbled by hand |
| 3 | Mixture of polyoxyethylene-based prepolymer with prepolymer of Run 1 | Strong, broken by hand only with extreme difficulty, very soft and spongy when soaked with water |
| 4 | Mixture of polyoxyethylene-based prepolymer with prepolymer of Run 2 | Very strong, could not be broken by hand, slightly soft when soaked in water but essentially maintained strength |

The above results show that prepolymers of this invention (Runs 3 and 4) yield superior consolidated structures as compared to the control prepolymers (Runs 1 and 2), the prepolymer mixture of Run 4 containing polymeric polyisocyanate-based prepolymer yielding the strongest consolidated structure.

EXAMPLE 6

The procedure of Example 5 was repeated using acetone solutions of different ratios of prepolymers to consolidated soil samples. Results are summarized below:

| Run | Polyoxyethylene-based prepolymer* g. | Polyoxypropylene-based prepolymer** g. | Comparative nature of consolidated soil |
|---|---|---|---|
| 1 | 19 | 56 | poor strength, easily crumbled by hand |
| 2 | 35 | 35 | excellent hardness and toughness, could not be broken by hand |
| 3 | 0 | 75 | poor strength, easily crumbled by hand |
| 4 | 25 | 75 | poor strength, easily crumbled by hand |
| 5 | 50 | 50 | fair strength, broken by hand with some difficulty |

*Prepolymer used was that of Example 1
**In Runs 1, 2, and 3, the prepolymer was that of Run 2 of Example 5, and in Runs 4 and 5, it was that of Run 1 of Example 5.

The above results show that prepolymer mixtures of this invention (Runs 2 and 5) yield superior consolidated structures, Run 2 (containing the polymeric polyisocyanate-based prepolymer) yielding the strongest consolidated structure.

EXAMPLE 7

A 30 sq. ft. plot of soil was raked and smoothed and then sprinkled with one gallon of a 33 wt. percent acetone solution of the prepolymer of Example 1. Immediately thereafter, grass seed was uniformly spread over the treated soil in the amount of 2-5 pounds/1,000 ft$^2$ and raked into the treated soil to a depth of 1-2 inches. The treated soil was immediately then watered lightly. The prepolymer consolidated the soil in about 10-20 min. to a rubbery consistency and the soil readily soaked up water. A laboratory test, run in a similar manner, using rye grass seed, resulted in germination of about 85 percent of the seed, compared to about 70-75 percent germination of seed planted in untreated soil.

EXAMPLE 8

A series of samples of sandy topsoil was treated with varying amounts of 30 wt. percent acetone solution of the prepolymer of Example 1. The wet samples were molded in the form of cones, 3¼ inches in height with a 4½ inches diameter base and sprinkled with water. After standing for about 16 hrs. to allow formation of a solid polyurethane-polyurea matrix, the consolidated cones were tested to determine resistance to water erosion. This erosion test was performed first drying the cones to constant weight and then directing a stream of 5 gallons of water at the apex of each cone over a 15 min. period. The cones were then dried to constant weight, and the difference in weight of the cones before and after the erosion test for each sample computed, this difference representing the amount of sand eroded. Results are summarized below.

| Run | Amt. of prepolymer applied to soil, wt. % by wt. of treated soil | Amt. of soil lost by erosion, wt. % of treated soil |
|---|---|---|
| 1 | 0 (control) | 100 |
| 2 | 2 | 4 |
| 3 | 3 | 4.6 |
| 4 | 4 | 0.7 |
| 5 | 6 | 0.7 |
| 6 | 8 | 1.3 |
| 7 | 10 | 1 |

These data show the improved resistance to erosion obtained by the invention.

Various modifications and alterations of this invention will become apparent to those skilled in the art without departing from the scope and spirit of this invention, and it should be understood that this invention is not to be unduly limited to the illustrative embodiment set forth herein.

I claim:

1. A method for consolidating a relatively unconsolidated or loose permeable mass of superficial mineral aggregate, which comprises
   a. contacting the top surface of said mass with a fluid agent comprising an admixture of water-immiscible urethane prepolymer and hydrophilic urethane prepolymer, saud hydrophilic urethane prepolymer having a plurality of oxyethylene units in its polymer backbone, said admixture being water-miscible,
   b. allowing said fluid agent to permeate said mass by gravity flow and fill interstitial voids therein, and
   c. curing the permeated prepolymer in the presence of water to form in situ a hydrophilic, water-insoluble polymeric matrix which bonds said aggregate as a consolidated unitary mass.

2. The method according to claim 1, wherein said hydrophilic prepolymer has the formula

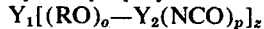
$Y_1[(RO)_o—Y_2(NCO)_p]_z$ where $Y_1$ is an active hydrogen-free residue of a compound having a plurality of active hydrogen atoms, $(RO)_o$ is a hydrophilic polyoxyalkylene chain having a plurality of oxyethylene units, o is the number of oxyalkylene units in said chain, $Y_2$ is an organic linkage bonding said chain to the isocyanate moieties shown in said formula, p is 1 to 5, and z is equal to the number of said active hydrogen atoms in said compound from which $Y_2$ is derived.

3. The method according to claim 1, wherein said aggregate comprises soil.

4. The method according to claim 1, wherein said aggregate comprises sand.

5. The method according to claim 1, wherein said water-immiscible urethane prepolymer comprises a polyoxypropylene glycol-based urethane prepolymer having at least two isocyanate moieties.

6. The method according to claim 1, wherein said water-immiscible prepolymer has the formula

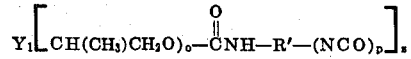

$$Y_1\left[CH(CH_3)CH_2O)_o—\overset{O}{\overset{\|}{C}}NH—R'—(NCO)_p\right]_z$$

where $Y_1$ is an active hydrogen atom-free residue of a compound having a plurality of active hydrogen atoms, R' is an aromatic nucleus derived from an organic polyisocyanate, o is the number of oxypropylene units shown in said formula, p is 1 to 3, and z is 2 to 3.

7. The method according to claim 6, wherein $Y_1$ is derived from propylene glycol, $R'$ is derived from polymethylene polyphenyl polyisocyanate, $o$ is about 33, $p$ is about 2.7 and z is 2.

8. The method according to claim 1, wherein said hydrophilic urethane prepolymer has the formula

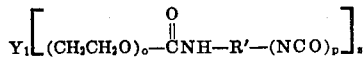

where $Y_1$ is an active hydrogen atom-free residue of a compound having a plurality of active hydrogen atoms, $R'$ is an aromatic nucleus derived from an organic polyisocyanate, $o$ is the number of oxyethylene units shown in said formula, $p$ is 1 to 3, and $z$ is 2 to 3.

9. A method in accordance with claim 1, wherein said fluid agent further contains grass seed, fertilizer, herbicide, pigment or mulch.

10. A method for consolidating a relatively unconsolidated or loose permeable mass of superficial mineral aggregate which comprises
   a. contacting the top surface of said mass with a fluid agent comprising hydrophilic urethane prepolymer having a plurality of oxyethylene units in its polymer backbone;
   b. allowing said fluid agent to permeate said mass by gravity flow and fill interstitial voids therein; and
   c. curing the permeated prepolymer in the presence of sufficient water to form in situ a foamed, cellular, water-insoluble, hydrophilic polymeric matrix which bonds said aggregate as a consolidated unitary mass which is water-permeable.

11. A method in accordance with claim 10, wherein said fluid agent further contains grass seed, fertilizer, herbicide, pigment or mulch.

* * * * *